March 26, 1935.   C. B. CLARK   1,995,292
MANUFACTURE OF SULPHURIC ACID
Filed Sept. 5, 1929   2 Sheets-Sheet 1
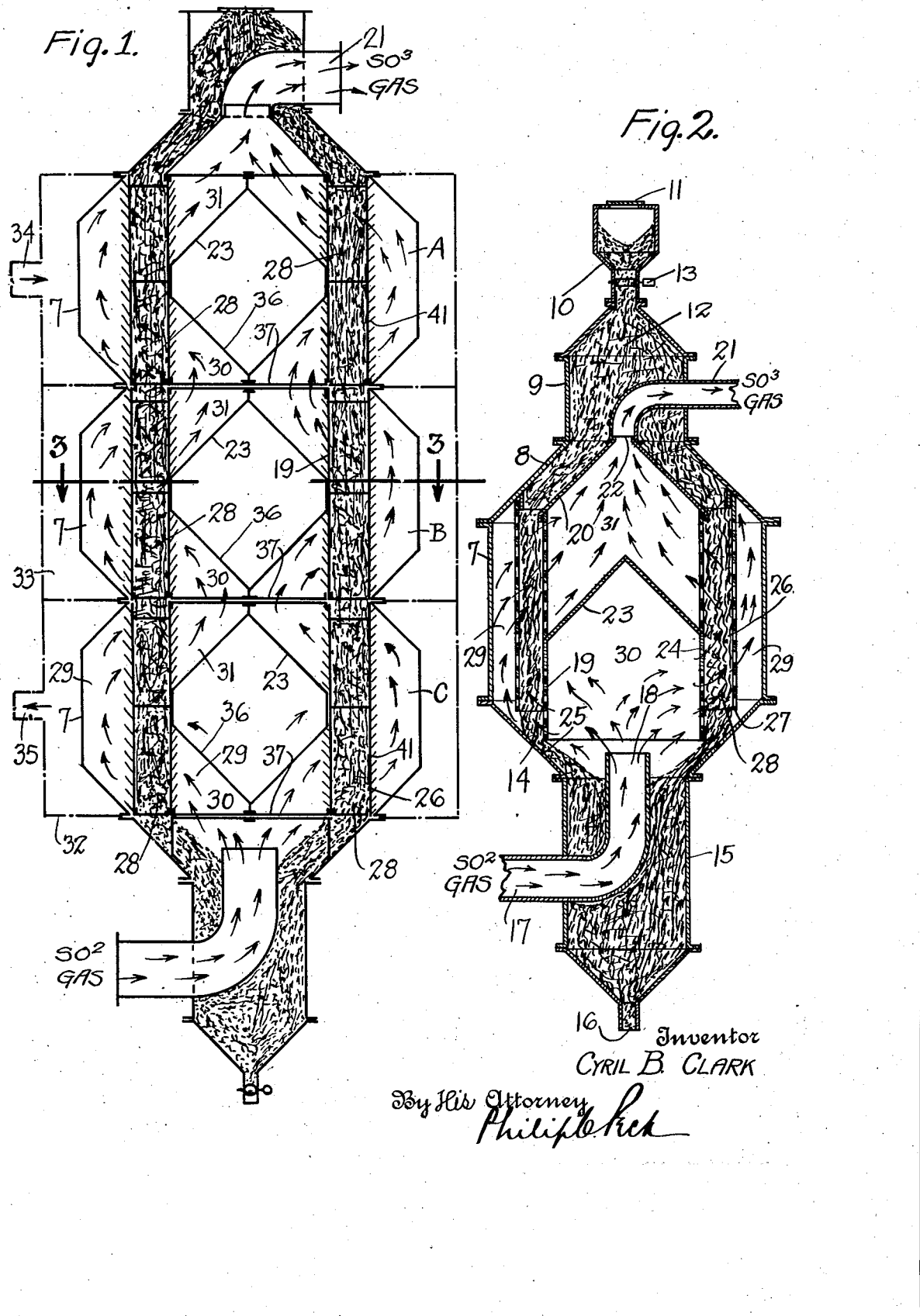
Inventor
CYRIL B. CLARK
By His Attorney March 26, 1935.  C. B. CLARK  1,995,292
MANUFACTURE OF SULPHURIC ACID
Filed Sept. 5, 1929  2 Sheets-Sheet 2
Fig. 3.
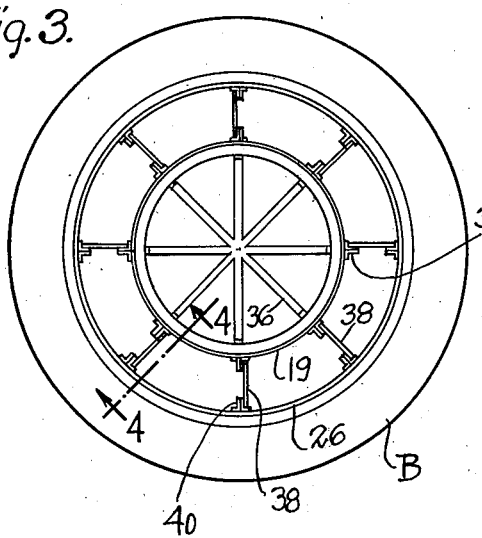
Fig. 5.
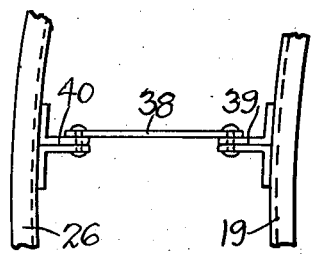
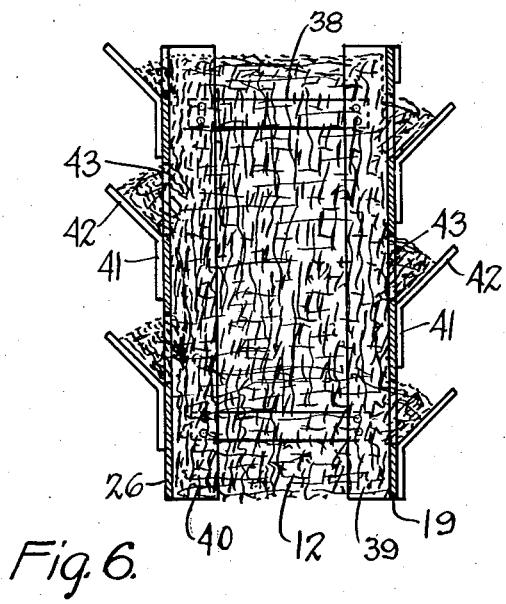
Fig. 6.
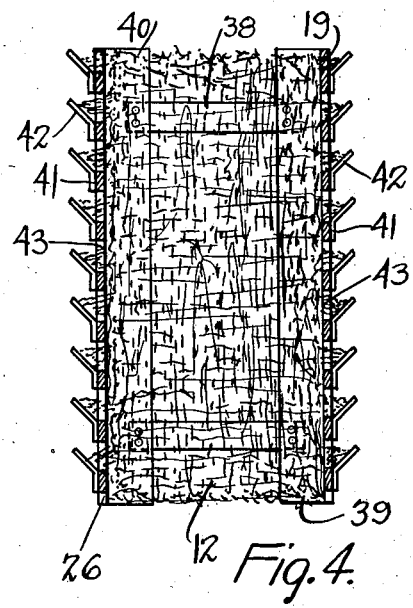
Fig. 4.
Inventor
CYRIL B. CLARK
By His Attorney
Philip C. Peck Patented Mar. 26, 1935

1,995,292

UNITED STATES PATENT OFFICE 1,995,292

MANUFACTURE OF SULPHURIC ACID

Cyril B. Clark, Scarsdale, N. Y., assignor, by mesne assignments, to American Cyanamid & Chemical Corporation, a corporation of Delaware Application September 5, 1929, Serial No. 390,510

5 Claims. (Cl. 23—288)

My invention relates to improved processes for the manufacture of sulphuric acid by the catalytic oxidation of sulphur dioxide to sulphur trioxide, and includes a novel type of self-cleaning converter for exothermic catalytic reactions which is particularly advantageous when used with non-poisoning vanadium catalysts such as are described in United States Patents No. 1,675,308 of June 26, 1928 and No. 1,694,123 of December 4, 1928. Other types of catalyst may also be advantageously used in my improved converter.

It is known that the conversion of sulphur dioxide-containing gases derived from the ore burners to sulphur trioxide at various temperatures depends largely on the relations between the percentage conversion obtained and the length of time the gas is brought in contact with the catalyst. As the reaction progresses a longer time of contact with the catalyst is required for each percent of conversion obtained. For example, at 400° C. if one unit of time is required to obtain 50% conversion, about four units of time will be required to obtain 80% conversion, ten units of time for 94% conversion, and twenty units of time for 96% conversion.

I have discovered an improved and economical method for such catalytic oxidation of sulphur dioxide by decreasing gradually the velocity of the gas through the catlyst mass and thus gradually increasing the time contact of the gas with the catalyst, while cooling the gas exteriorly, which procedure will result in marked improvements in the conversion to sulphur trioxide obtainable.

In my improved methods the gas stream passes at least twice through the catalyst mass in the converter which is specially designed to force the gas back and forth through the catalyst bed in opposite directions, such catalyst bed being disposed preferably in annular form concentrically within the converter shell which may be cooled by controlled circulation of air exteriorly of the shell if desired. My improved converter is especially designed to carry out the various novel steps in this process for the economical manufacture of sulphuric acid.

My converter as herein shown also combines novel means for automatically collecting the dust and fume from the gases outside the screens as they pass through the catalyst bed which dust and fume are collected in the bottom of the converter and may be removed along with the dirty catalyst as required.

The gas velocity is highest as the gas first enters and penetrates the catalyst and lowest as the gas leaves the catalyst mass. Hence I advantageously control the gas velocity as well as the time contact by decreasing the velocity of the gas in and through the catalyst while prolonging the contact between the gas and catalyst necessitated by the reaction which may be applied to any exothermic catalytic reaction.

Furthermore to obtain the maximum efficiency from the catalyst in oxidizing sulphur dioxide to sulphur trioxide, the temperature of the gas in contact with the catalyst should preferably gradually decrease from the point where the gas first enters the catalyst to the point where the gas passes out of the catalyst. As the reaction progresses heat is generated in proportion to the $SO_2$ converted to $SO_3$. Since the major portion of the reaction will occur with a comparatively small amount of catalyst, the greater part of the heat of reaction will be developed at or near the point where the gas enters the catalyst.

In the drawings, Fig. 1 is a sectional elevation somewhat in diagrammatic form of a plurality of assembled sections of my improved converter shown more in detail in Fig. 2;

Fig. 2 is a sectional elevation of my converter unit;

Fig. 3 is a detail view taken on the line 3—3 of Fig. 2;

Fig. 4 is an enlarged detail view taken on the line 4—4 of Fig. 3;

Fig. 5 is a detail view of the braces for the screens shown in Fig. 3;

Fig. 6 is an enlarged view showing a modified form of vane structure shown in Fig. 4.

Similar numerals refer to similar parts throughout the several figures.

Referring to Fig. 2 showing the single unit converter, the cylindrical shell 7 supports the dome-shaped cover 8 which carries the cylindrical shell 9 upon which is mounted the catalyst bin 10 having the lid 11. Catalyst material 12 passes by gravity from the bin 10 through the gate 13 into the shell 9. Below the shell 7 is secured the inverted dome-shaped bottom 14 (similar in form to the cover 8) to which is fastened the inverted dome-shaped container 15 for the dirty catalyst and dust having the outlet 16.

The $SO_2$ gas inlet 17 connected with the burners (not shown) enters the container 15 and has its outlet port 18 concentrically disposed in the converter proper. The inner perforated screen 19, preferably in cylindrical form is fastened at the top to the lower rim of the conical plate 20 carried by the outlet pipe 21 for the $SO_3$ gas which is fastened to the shell 9. The plate 20 has the orifice 22 formed in its top which orifice is connected with the lower end of the outlet pipe 21 as shown.

The conically shaped solid plate 23 having the depending skirt 24 is fastened to the screen 19 preferably around the middle portion thereof, and the lower rim of such screen 19 is cut off to provide an annular passage 25 for the catalyst material to pass downwardly between the bottom 14 and the screen 19.

Concentrically surrounding the screen 19 is the outer perforated screen 26 fastened to the cover 8 and with the lower rim 27 spaced from the bottom 14 adjacent the bottom of the shell 7. The annular space between the screens 19 and 26 provides the active catalyst bed 28 containing the catalyst 12. The annular compartment 29 between the outer shell 7 and the outer screen 26 forms a gas passage for reversing the gas stream from the lower chamber 30 below the plate 23 to the upper chamber 31 communicating with the outlet pipe 21.

In the operation of this converter according to my improved methods, the $SO_2$ gas enters through the pipe 17 into the chamber 30 where it is preheated and then passes through the lower part of the catalyst bed 28 into the compartment 29 where it is cooled; then the gas passes inwardly through the upper part of the catalyst bed 28 into the upper chamber 31 and is finally discharged through outlet pipe 21. The arrows in Fig. 2 show the path of the gas alternately in opposite directions through the converter. Clean catalyst in the bin 10 is drawn as required into the bed 28 between the screens 19 and 26, and is discharged through the outlet 16. All dust collected in the compartment 29 and chamber 30 as well as in the catalyst bed 28 is discharged with the catalyst through the outlet 16, while dust collecting on the plate 23 passes into the catalyst bed 28. The plate 23 and skirt 24 prevent the gas short-circuiting the catalyst.

The gas entering through the pipe 17 is preferably heated to a temperature of 700° F. and will be further heated to around 900° F. in the chamber 30 as it first passes into the catalyst bed 28, the gas gradually cooling as it leaves through the outlet pipe 21 to about 750 to 800° F. In the converter shown and as hereinbefore described, the dust and fume is practically removed from the $SO_3$ gas issuing from the pipe 21 and such gas is passed into the usual absorbers (not shown), where an absorption of the gas from 95 to 98% may be obtained.

In Fig. 1, three separate sections A, B and C, substantially like the single unit converter shown in Fig. 2, are superposed, in which the gas stream passes six times through the common catalyst bed 28 before passing out of the converter unit A through the outlet 21. The amount of catalyst in the separate units may be varied at will so as to provide a free passage for the gas stream in reverse direction from the compartments 29 to the chambers 31. Since the general structure of these units A, B and C is substantially similar to the single unit shown in Fig. 2 and already set forth in detail, it will only be necessary to describe the additional features of construction shown in Fig. 1 and also in detail in Figs. 3–6.

As shown in Fig. 1, the outer casing 32 surrounds the units A, B and C joined together to provide a cooling chamber 33 through which air is passed from the pipe 34 and is removed through the pipe 35 as indicated by arrows whereby the outer shells 7 of the successive units A, B and C are cooled to gradually cool the rising gas stream within as it is alternately reversed through the catalyst bed 28.

As shown in Fig. 3, I have provided a series of brace members 36 (eight being shown in Fig. 3) radiating from the center of the cross bars 37 at the bottom of each unit A, B and C. The upper ends of the brace members 36 are fastened to the skirts 24 to hold the inner screens 19 in position.

As shown in Figs. 3 and 5, the screens 19 and 26 are held in concentric position to provide the catalyst bed 28 of substantially uniform thickness by means of a series of plates 38 riveted to the brackets 39 and 40 fastened to the screens 19 and 26 respectively.

Referring to Figs. 1, 4 and 6, I have provided novel means for collecting dust and fume from the compartments outside the perforated screens 19 and 26 and returning same to the catalyst bed 28 for subsequent removal: Such means comprise annular vanes 41 fastened to the solid parts of the screens having faces 42 upwardly inclined to partly close the openings 43 cut in the screens 19 and 26. In the Fig. 4 construction the vanes 41 are horizontally disposed, while in Fig. 6, the arrangement is staggered. In both Figures a part of the catalyst projects through the openings 43 and rests on the vanes 41, and the dust is collected on the faces 42 which are suitably inclined to permit the dust to mingle with the catalyst and shift through the catalyst bed 28 to be discharged through the outlet 16 as in the Fig. 2 converter.

In the operation of the multiple converter shown in Fig. 1, the gas stream enters the inlet 17 and alternately passes through the catalyst bed 28 in opposite directions in each unit A, B and C, the arrows indicating the approximate paths of the gas as it rises through the converter, the $SO_3$ gas finally passing out of the outlet pipe 21 as in the Fig. 2 construction. Meanwhile the gas stream is advantageously cooled by the surrounding air jacket in the chamber 33 with cooling air entering the pipe 34 and passing out of the chamber 33 through the pipe 35.

In both Fig. 1 and Fig. 2 converters, the velocity of the gas stream is gradually diminished as the gas stream passes upwardly thereby increasing the time contact of the gas with the catalyst, while such gas stream is advantageously cooled in the compartments 29.

I claim as my invention: —

1. In a device of the character described, a shell, a pair of concentric perforated screens therein and carrying a mass of catalyst material therebetween, means to flow a gas to be subjected to catalysis through both screens and the material therebetween, means to flow the gas in a reverse direction through both screens and the material therebetween, and means for venting the thus treated gas, and an outer casing spaced from said shell, and means to pass cooling air between the casing and the shell.

2. In a device of the character described, a plurality of vertically superimposed gas treating units, each of which comprises an inner and outer shell defining gas passages therebetween, a pair of concentric perforated screens between the shells, a gas treating medium between the screens, said shells having portions substantially in contact with a screen and other portions spaced therefrom, whereby a gas passage is formed and the gas is caused to flow through both screens and the gas treating material in one direction and then back again in the reverse direction.

3. In a device of the character described, a plurality of vertically superimposed catalytic converter units, each unit comprising an inner and outer shell defining gas passages therebetween, a pair of concentric perforated screens between the shells, a sulphur dioxide catalyst between the screens, said shells having portions substantially in contact with a screen and other portions spaced therefrom, whereby a gas passage is formed and the gas is caused to flow through both screens and the catalyst material in one direction and then back again in the reverse direction, means to supply sulphur dioxide and oxygen containing gases to the lowermost converter unit, means to take off the reacted gas from the uppermost converter unit, means to feed fresh catalyst to the uppermost converter unit and means to remove spent catalyst from the lowermost converter unit.

4. The device of claim 2 in which the gas passage is of substantially uniform cross-sectional area.

5. The device of claim 2 in which both the inner and outer shells include conical elements with their bases facing each other.

CYRIL B. CLARK.